(12) United States Patent
Hallak

(10) Patent No.: US 12,160,177 B2
(45) Date of Patent: Dec. 3, 2024

(54) CIRCUIT ARRANGEMENT FOR A RESONANT CONVERTER

(71) Applicant: Siemens Aktiengesellschaft, Munich (DE)

(72) Inventor: Jalal Hallak, Vienna (AT)

(73) Assignee: SIEMENS AKTIENGESELLSCHAFT, Munich (DE)

(\*) Notice: Subject to any disclaimer, the term of this patent is extended or adjusted under 35 U.S.C. 154(b) by 241 days.

(21) Appl. No.: 17/959,407

(22) Filed: Oct. 4, 2022

(65) Prior Publication Data
US 2023/0109133 A1 Apr. 6, 2023

(30) Foreign Application Priority Data
Oct. 6, 2021 (EP) .................... 21201122

(51) Int. Cl.
*H02M 3/335* (2006.01)
*H02M 3/00* (2006.01)

(52) U.S. Cl.
CPC ......... *H02M 3/33573* (2021.05); *H02M 3/01* (2021.05)

(58) Field of Classification Search
CPC ............. H02M 3/305; H02M 3/33569; H02M 3/33573; H02M 3/01
See application file for complete search history.

(56) References Cited

U.S. PATENT DOCUMENTS

| 9,065,343 | B2 | 6/2015 | Hu |
| 2012/0147629 | A1 | 6/2012 | Mao et al. |
| 2015/0049520 | A1* | 2/2015 | Xu ................ H02M 3/33573 363/21.02 |
| 2015/0249394 | A1 | 9/2015 | Liu et al. |
| 2021/0058004 | A1 | 2/2021 | Maki et al. |

FOREIGN PATENT DOCUMENTS

EP 2936668 B1 9/2018

OTHER PUBLICATIONS

EP Search Report dated Mar. 22, 2022 based on EP21201122 filed Oct. 6, 2021.

\* cited by examiner

*Primary Examiner* — Adolf D Berhane
(74) *Attorney, Agent, or Firm* — Cozen O'Connor

(57) ABSTRACT

A circuit arrangement for a resonant converter, wherein the resonant converter includes a galvanic isolation, where on the primary side the resonant converter includes a resonant inductor, a resonant capacitor and switching elements, which each have a switching frequency, where a resonant current flows through the resonant inductor and the resonant capacitor by switching the switching elements, where a bidirectional switching element is arranged in a current path of the resonant current flowing through the resonant inductor and the resonant capacitor, where a series circuit of a diode pair has a center connected to a terminal of the resonant inductor or resonant capacitor and each respective ends thereof to a switching element of the primary-side switching elements.

15 Claims, 2 Drawing Sheets

CIRCUIT ARRANGEMENT FOR A RESONANT CONVERTER

BACKGROUND OF THE INVENTION

1. Field of the Invention

The present invention relates generally to the field of electrical engineering, in particular power electronics and power electronics circuits for power supply and, more specifically, relates to a circuit arrangement for a resonant converter that includes a galvanic isolation, in particular a transformed, where on the primary side the resonant converter comprises at least one resonant inductor, at least one resonant capacitor and at least two switching elements, for which in each case a switching frequency is specified, where a resonant current flows through the at least one resonant inductor and through the at least one resonant capacitor, and where the at least two switching elements arranged on the primary side are switched at the respectively specified switching frequency.

2. Description of the Related Art

Nowadays in modern power supplies for electrical devices, resonant converters are increasingly often being employed for power transmission. Resonant converters represent a special circuit engineering form of a DC-to-DC converter, which works for power transmission with an oscillating circuit or resonant circuit. Here, the resonant converter converts an input-side DC voltage into a single- or multiphase AC voltage, where for optimum operation it is typically operated with an approximately constant load. The AC voltage can be rectified back into a specifiable output voltage by a rectifier unit arranged on the output side. If no rectification occurs on the output side of the resonant converter, then the resonant converter is also referred to as an inverter.

Normally, in the case of a resonant converter, the resonant circuit is constructed from at least one resonant capacitor and at least one resonant inductor. Depending on the circuit structure, the resonant circuit can, for example, be arranged on a primary or secondary side of a galvanic isolation used or of a transformer and can be constructed as a series resonant circuit or parallel resonant circuit. Normally, the resonant circuit is formed from the power transmission line with the galvanic isolation or with the transformer together with at least one resonant capacitor, where the leakage inductor of the transformer alone or the leakage inductor of the transformer together with at least one further inductor, for example, can be used as a resonant inductor. Depending on the application, resonant converters can thus be formed, for example, as what are known as LLC (=LCL) or LCC converters.

To regulate the output voltage, resonant converters are normally actuated at a fixed duty factor and a variable frequency or switching frequency. The switching frequency serves as the basis for the control signals for switching the at least two primary-side switching elements, as a result of which a resonant current flows through the resonant circuit. Here, a pulse length of the control signal (for example, square wave signal) of the respective switching element substantially corresponds to a half oscillation period of the resonant circuit, in order to enable an activation and deactivation of the at least two primary-side switching elements in an oscillation zero crossing of the current or of the voltage, i.e., in order to enable what is known as zero voltage switching (ZVS) or zero current switching (ZCS). A distinction can be made, for example, between resonant converters with zero voltage switching and resonant converters with zero current switching, where mostly both coincide. This means that the range of the switching frequency, which in each case is specified for the primary-side switching elements or with which these can be switched, is codetermined by the resonant circuit (i.e., particularly by the at least one resonant inductor and by the at least one resonant capacitor of the resonant converter). In the case of a resonant converter the resonant circuit normally ensures that the switching elements can substantially be switched in the current zero crossing and/or the voltage zero crossing. As a result, during the switching operations the power loss is minimized and electromagnetic interference is kept low.

Because of their frequency-dependent components, such as transformers, capacitors and where appropriate additional inductors, resonant converters have a frequency-dependent voltage transformation ratio between output voltage and input voltage. By, for example, choosing the appropriate numbers of windings of the transformer employed in the resonant converter, this transformation ratio can be further adjusted. This transformation ratio is, however, load-dependent up to a specific switching frequency. Resonant converters generally consist of two or more frequency-dependent components (for example capacitors, coils and/or transformers). Consequently, there are often multiple resonant frequencies, where mostly only in the case of a particular resonant frequency does a load-independent transformation ratio occur. This particular resonant frequency is the frequency that occurs in the case of the resonance of the resonant inductor and the resonant capacitor and not in the case of a low resonant frequency of the transistor main inductor plus resonant inductor and the resonant capacitor. Only in the case of operation at exactly this resonant frequency (i.e., the resonant frequency that is specified by the resonant inductor and resonant capacitor) as the switching frequency for primary-side switching elements are the switching losses of the resonant converter virtually zero or very low. The resonant converter then works very efficiently and at its most effective and, in the case of the resonant frequency, has an almost constant transformation ratio between input voltage and output voltage, which is oriented only to the turns ratio between primary and secondary windings of the transformer used.

In the case of an overload situation (for example, overload and/or short-circuit) it may, however, be necessary to reduce the output voltage of the resonant converter, in order, for example, to ensure a required current-voltage characteristic for current limiting or until the short-circuit occurs. To achieve such a necessary reduction in the output voltage of the resonant converter, the switching frequency or operating frequency of the resonant converter can, for example, be raised beyond the resonant frequency. In other words, the primary-side switching elements are operated at a higher switching frequency than at the resonant frequency. Here, the resonant converter deviates from ideal operation at the resonant frequency. This results in higher losses (despite a falling output power). Because of the higher switching frequency, the primary-side switching elements can, for example, no longer be switched in the voltage zero crossing (known as zero voltage switching or ZVS) or in the current zero crossing (known as zero current switching or ZCS), but are, for example, activated and deactivated in a "hard" manner, the consequence being a considerable power loss in the switching elements. Furthermore, because of the increase in the switching frequency, increased losses also, for example, arise at the transformer, at an additional resonant inductor that is present if appropriate and at a rectifier unit arranged on the secondary side (for example diodes, synchronous rectifiers).

To prevent massively increasing losses in the resonant converter when the output voltage falls by raising the switching frequency above the resonant frequency, the opportunity exists, for example, to connect an additional converter stage, in particular a voltage reduction unit, in series with the resonant converter on the input side. By connecting the additional converter stage or a voltage reduction unit in series, it is ensured that the resonant converter can again work with a fixed transformation ratio or wherever possible in resonant operation, because by virtue of the converter stage connected in series the input voltage of the resonant converter is adjusted appropriately to the reduced output voltage of the resonant converter. However, connecting the additional converter stage in series is associated with an increased space requirement and costs. Furthermore, this additional converter stage is in operation not only, for example, in an overload situation, but also when the resonant converter is operated in normal mode at the resonant frequency or at the rated load. As a result, during the normal mode of the resonant converter an unnecessary power loss arises because of the converter stage connected in series.

SUMMARY OF THE INVENTION

In view of the foregoing, it is therefore and object of the invention to provide a circuit arrangement for a resonant converter which in the event of an overload situation enables the output voltage to be reduced in an efficient and space-saving manner and without any additional power loss.

This and other objects and advantages are achieved in accordance with the invention by a circuit arrangement for a resonant converter in which a bidirectional switching element is arranged in a current path of the resonant current through the at least one resonant inductor and through the at least one resonant capacitor. Furthermore, a diode pair is provided which is arranged as a series circuit. Here, a center of the series circuit of the diode pair is connected to a terminal of the at least one resonant inductor or to a terminal of the at least one resonant capacitor, and a respective end of the series circuit of the diode pair is each connected to a switching element of the at least two primary-side switching elements, such that a functionality of a voltage reduction unit is integrated, in the event that the bidirectional switching element is synchronized or is activated approximately simultaneously with a switching element, to be activated in each case, of the at least two primary-side switching elements and is deactivated before a switching element, to be deactivated in each case, of the at least two primary-side switching elements. Here, the at least one resonant inductor is used as an inductor and the diode pair is used as free-wheeling diodes for the functionality of the voltage reduction unit.

The main aspect of the inventively proposed solution is that by adding a bidirectional switching element and the diode pair and by appropriate switching of the bidirectional switching element, i.e., an activation of the bidirectional switching element synchronized with the switching element to be activated in each case for the actuation of the resonant converter, but a deactivation before the switching element activated in each case for the actuation of the resonant converter, a functionality of a voltage reduction unit can easily be integrated into the resonant converter, for both positive and negative power half-waves. This means a functionality of a voltage reduction unit is integrated into the resonant converter, by virtue of which an amount of an output voltage is always less than an amount of an input voltage or a transformation ratio of the resonant converter is changed. In other words, if the bidirectional switching element arranged in the current path of the resonant current is switched, then the bidirectional switching element together with the at least one resonant inductor and the diode pair as free-wheeling diodes form a voltage reduction unit, by which the task is fulfilled, i.e., if necessary (for example, in the case of overload, and/or short-circuit) decreasing an input voltage applied to the resonant converter at least for parts of the switching period of the resonant converter and thus reducing the output voltage. The at least two primary-side switching elements for the actuation of the resonant converter can ideally also, in the event of an overload, be clocked at the resonant frequency as the switching frequency (i.e., as in normal mode or in resonant mode), as a result of which the switching losses continue to remain as low as possible.

With the inventive circuit arrangement, a converter stage or voltage reduction unit stage connected in series with the resonant converter and an intermediate circuit capacitor connected on the load side to the converter stage or connected in series with the resonant converter can be saved. As a result, better efficiency is also achieved, because a power loss of a voltage reduction unit stage connected in series is eliminated. Furthermore, the circuit arrangement can be formed in a more space-saving manner by the elimination of the voltage reduction unit stage, in particular a reactor of the voltage reduction unit, and of the intermediate circuit capacitor.

It is advantageous if the bidirectional switching element is controlled as a function of an output voltage of the resonant converter. In other words, the bidirectional switching element is (providing it clocks) ideally switched on a pulse-width-modulated basis or at a constant frequency and variable duty factor of the control signal. The bidirectional switching element is ideally activated synchronized with the primary-side switching element to be activated in each case. In other words, the bidirectional switching element is wherever possible activated simultaneously or with as small a time offset as possible with the switching element of the resonant converter to be activated in each case. A deactivation time point of the bidirectional switching element can, however, be established by the voltage-dependent actuation in a half switching period of the switching element to be activated in each case, such that a reduction to, for example, a specifiable value of the output voltage of the resonant converter is achieved. Thus, for example, by more rapidly deactivating the bidirectional switching element a greater reduction can be achieved than if this remains activated for longer.

It is expedient if during a normal mode of the resonant converter the bidirectional switching element is permanently activated. In this simple manner, the functionality of the voltage reduction unit is switched off. The circuit arrangement works as a resonant converter in normal mode or in resonant mode.

Alternatively, a bridging unit is ideally provided, which is arranged in parallel with the bidirectional switching element. By closing the bridging unit, the bidirectional switching element is bridged or short-circuited. In other words, the circuit arrangement works as a resonant converter in normal or resonant mode, so the bridging unit is closed and the bidirectional switching element can be deactivated. As a result, conduction losses, which would arise because of a bidirectional switching element being permanently activated, are reduced in a simple manner. Should an overload situation occur that requires a reduction in the output voltage, the switching frequency specified for the primary-side switching elements can, for example, be briefly increased until the bridging unit is opened. If the bridging unit is deactivated and the bidirectional switching element starts to switch, then the primary-side switching elements can again be actuated at the resonant frequency as the switching frequency. A semiconductor switch, a relay or what is known as a micro-electro-mechanical system (MEMS) can be employed as a bridging unit.

In an advantageous embodiment of the switching arrangement, the at least two primary-side switching elements are arranged on the input side as a half-bridge circuit. The embodiment as a half-bridge circuit comprises two switching elements which, for example, via appropriate actuation circuits, switch alternately or by turns with a short pause (dead time). Here, for the integration of the functionality of the voltage reduction unit, the center of the series circuit of the diode pair is connected to a terminal of the at least one resonant inductor, which is connected to a first end of the bidirectional switching element. Furthermore, the at least one resonant capacitor has two capacitors arranged in series, where a center of the series circuit of the two capacitors is connected to a second end of the bidirectional switching element and the respective ends of the series circuit of the two capacitors are connected to the respective ends of the series circuit of the diode pair.

In an expedient embodiment of the inventive circuit arrangement, two further switching elements are provided on the primary side, which are arranged with the at least two primary-side switching elements as a full-bridge circuit. Usually in the case of a full-bridge circuit, four switching elements with an appropriate actuation circuit are employed. Two switching elements are always activated simultaneously (for example, always the diagonally opposite ones), followed by a dead time, then both the other switching elements are activated. While the half-bridge circuit is simpler in structure and more cost-effective, a full-bridge circuit has the advantage of the lower current load of the switching elements compared to the half-bridge circuit, which does produce smaller losses, but generally the advantages of a full-bridge circuit do not outweigh this until high outputs of significantly greater than 1 kW are reached.

In one specific embodiment of the circuit arrangement, using a full-bridge circuit provides for connection of the center of the series circuit of the diode pair to a terminal of the at least one resonant inductor, which is connected to a first terminal of the at least one resonant capacitor. Furthermore, a second terminal of the at least one resonant capacitor is connected to a first terminal of the bidirectional switching element. A center of a series circuit made up of the two further primary-side switching elements is connected to a second terminal of the bidirectional switching element. Furthermore, the respective ends of the series circuit of the diode pair are each connected to a switching element of the at least two primary-side switching elements and in each case to one of the two further primary-side switching elements.

Alternatively when using a full-bridge circuit the circuit arrangement can ideally be configured such that the at least one resonant capacitor is connected by a first terminal to the at least one resonant inductor. Furthermore, a second terminal of the resonant capacitor is connected to a first terminal of the bidirectional switching element and to the center of the series circuit of the diode pair. Connected to a second terminal of the bidirectional switching element is a center of a series circuit or half-bridge circuit made up of the two further primary-side switching elements. Furthermore, the respective ends of the series circuit of the diode pair are again each connected to a switching element of the at least two primary-side switching elements and in each case to one of the two further primary-side switching elements.

It is furthermore advantageous if the bidirectional switching element is composed of anti-serially switched transistors, in particular field-effect transistors or MOSFETs. In this case the term "anti-serial" refers to a series connection of transistors, in particular field-effect transistors, with opposite polarity. In other words, for example, a source terminal of a first field-effect transistor is connected to a source terminal of a second field-effect transistor in terms of wiring technology. It is further possible for a drain terminal of the first field-effect transistor to be connected to a drain terminal of the second field-effect transistor in terms of wiring technology. An anti-serial connection of transistors such as this is known for example from the publication EP 1 850 470 B1.

Alternatively, it may be expedient if a micro-electro-mechanical system (MEMS) is provided as a bidirectional switching element. A MEMS represents an electronic switch that can be actuated very easily by a control unit, in order to limit and/or switch a current flow. MEMS are normally tiny semiconductor elements that ideally combine logic components and micromechanical structures (for example, armatures that are moved by way of electrostatic forces) in one component.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of example on the basis of the attached figures, in which.

DETAILED DESCRIPTION OF THE EXEMPLARY EMBODIMENTS

Figure 1:
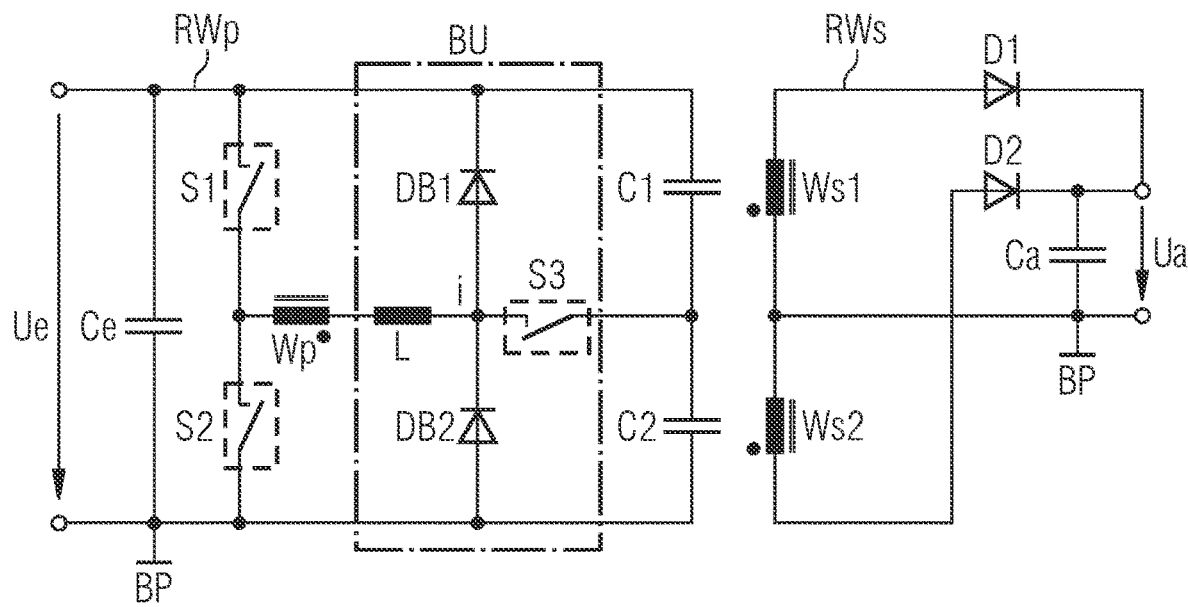
FIG. 1 shows schematically an exemplary circuit arrangement of an inventive resonant converter.

FIG. 1 schematically shows an exemplary embodiment of a resonant converter into which, in accordance with the invention, a functionality BU of a voltage reduction unit is integrated.

On the input side, an input voltage Ue (DC voltage) is applied to the resonant converter and can be related to a reference potential BP. An input capacitor Ce can also be arranged on the input side. Furthermore, two switching elements S1, S2 are switched in parallel with the input voltage Ue or to the input capacitor Ce, and are arranged as a half-bridge circuit. In other words, a first switching element S1 and a second switching element S2 are switched in series between a potential of the input voltage Ue and the reference potential BP. MOSFETs, bipolar transistors or IGBTs can for example be employed as switching elements S1, S2.

The resonant converter has a galvanic isolation that isolates the resonant converter in a primary side RWp and in a secondary side RWs. A transformer is, for example, used as a galvanic isolation, and comprises a primary winding Wp on the primary side RWp and, for example, two secondary windings Ws1, Ws2 on the secondary side RWs. The secondary windings Ws1, Ws2 can be formed either as two separate coils Ws1, Ws2 or as one coil with a center tap, where the center tap divides the coil into a first and a second secondary winding Ws1, Ws2.

Furthermore, a rectifier unit is provided on the secondary side RWs which, for example, comprises two diodes D1, D2. By virtue of the rectifier unit, an AC voltage, into which the input voltage Ue present on the primary side RWp is converted, is rectified on the secondary side RWs into a specifiable output voltage Ua. To this end, an anode of a first diode D1 is connected to a terminal of the first secondary winding Ws1 and an anode of a second diode D2 is connected to a terminal of the second secondary winding Ws2. The cathodes of the diodes D1, D2 are connected to one another and form a first terminal for a load. The second terminal for the load is formed by the center between the secondary windings Ws1, Ws2 or the center tap. The output voltage Ua of the resonant converter then drops at the terminals, where it is possible for an output capacitor Ca to be arranged in parallel with this. The output voltage Ua can likewise be related to the reference potential BP. Alternatively to a rectifier unit with two diodes D1, D2, what is known as a synchronous rectifier with two actuatable switching elements (for example, MOSFETs, and/or gallium-nitride switches) can also be used, where the first diode D1 is replaced by a switching element and the second diode D2 by a further switching element.

Alternatively, just one secondary winding Ws1, Ws2 can also be arranged on the secondary side which, for example, is fitted with four rectifier diodes D1, D2. A further embodiment of the secondary side RWs can, for example, have multiple secondary windings Ws1, Ws2 with associated rectifier units.

On the primary side RWp, a center of the half-bridge circuit of the two switching elements S1, S2 is connected on the input side to a terminal of the primary winding Wp of the transformer. The other terminal of the primary winding Wp is connected to the resonant circuit of the resonant converter, which has at least one resonant inductor L and at least one resonant capacitor C1, C2. In the simplest case, the resonant circuit can be formed from a leakage inductor of the transformer as a resonant inductor L and at least one resonant capacitor C1, C2.

In the exemplary embodiment of the inventive circuit arrangement shown in FIG. 1, a first terminal of the resonant inductor L is connected to the other terminal of the primary winding Wp. A second terminal of the resonant inductor L is connected to a center of a series circuit made up of two resonant capacitors C1, C2. Here, a bidirectional switching element S3 is arranged in a current path i of a resonant current that flows through the resonant inductor L and at least one of the two resonant capacitors C1, C2. In the exemplary embodiment shown in FIG. 1, the bidirectional switching element S3 is inserted, for example, between the second terminal of the resonant inductor L and the center of the series circuit of the two resonant capacitors C1, C2. The bidirectional switching element S3 can, in this case, be made up for example of anti-serially switched transistors (for example, MOSFETs). Alternatively, what is known as a micro-electro-mechanical system (MEMS) can, for example, be employed as a bidirectional switching element S3.

Furthermore, a diode pair DB1, DB2 that is arranged as a series circuit is provided. A center of the series circuit of the diode pair DB1, DB2 is connected to the second terminal of the at least one resonant inductor L and to each terminal of the bidirectional switching element S3, which is connected to the second terminal of the at least one resonant inductor L. A respective end of the series circuit of the diode pair DB1, DB2 is each connected to a respectively corresponding end of the series circuit of the resonant capacitors C1, C2 and in each case to an end of the half-bridge circuit of the primary-side switching elements S1, S2. Here, a first diode DB1 of the diode pair DB1, DB2 is, for example, connected to a first resonant capacitor C1 and a first switching element S1 of the half-bridge circuit where, for example, a first terminal for the input voltage Ue is formed from this connection. A second diode DB2 of the diode pair DB1, DB2 is, for example, connected to a second resonant capacitor C2 and a second switching element S2 of the half-bridge circuit where, for example, a second terminal for the input voltage Ue is formed from this connection, and, for example, is related to the reference potential BP.

In order to convert the input voltage Ue into the specifiable output voltage Ua on the secondary side RWs, the switching elements S1, S2 of the resonant converter arranged on the primary side are switched in turns with a short pause (what is known as dead time). For a corresponding clocking, a switching frequency in the form of control signals (for example, square-wave control signals) is specified for the switching elements S1, S2 in each case. As a result, the switching elements S1, S2 of the half-bridge circuit are activated alternately with a short pause or dead time and are each deactivated in a current and/or voltage zero crossing.

Furthermore, in normal mode of the resonant converter, i.e., in operation at rated load, the bidirectional switching element S3 is permanently activated. Alternatively, the bidirectional switching element S3 can in normal mode be bridged or short-circuited by a bridging unit (for example, semiconductor switch, relay, and/or MEMS). In other words, the exemplary circuit shown in FIG. 1 can be regarded as an LLC resonant converter, in which the second terminal of the resonant inductor L is directly connected to the center of the series circuit of the resonant capacitors C1, C2. The primary-side switching elements S1, S2 are ideally switched at the resonant frequency or the resonant converter works in resonant mode.

However, if an event (for example, overload, and/or short-circuit) occurs, in which a reduction in the output voltage Ua is necessary, then the bidirectional switching element S3 begins to switch within a half-period of the switching frequency of the switching elements S1, S2. Here, the control signal of the bidirectional switching elements S3 is synchronized with the control signals of the switching elements S1, S2, such that the bidirectional switching element S3 is activated with the switching element S1, S2 to be activated in each case. Here, a small time offset (for example, leading or lagging) can be provided between the activation of the bidirectional switching element S3 and the switching element S1, S2 to be activated, in order to split or optimize switching losses, for example.

The bidirectional switching element S3 is, however, deactivated within a half switching period of the switching element S1, S2 of the resonant converter to be activated in each case. In other words, the bidirectional switching element S3 is deactivated before the respectively activated switching element S1, S2 (=the switching element to be deactivated) is deactivated. Here, the bidirectional switching element S3 is actuated as a function of the output voltage Ua of the resonant converter, i.e., pulse-width-modulated. This is explained in greater detail below on the basis of FIG. 2.

By activating and deactivating the bidirectional switching element S3, the bidirectional switching element S3, together with the resonant inductor L and the diode pair DB1, DB2, form the functionality BU of a voltage reduction unit, where the diodes DB1, DB2 of the diode pair act as free-wheeling diodes. As a result, as in a voltage reduction unit, for at least a part of the half switching period of the respectively activated switching elements S1, S2, the input voltage Ue of the resonant converter is reduced and subsequently the output voltage Ua is decreased. The switching elements S1, S2 of the half-bridge circuit continue to clock as in normal mode or in resonant mode at the resonant frequency of the resonant converter as the switching frequency.

Figure 2:
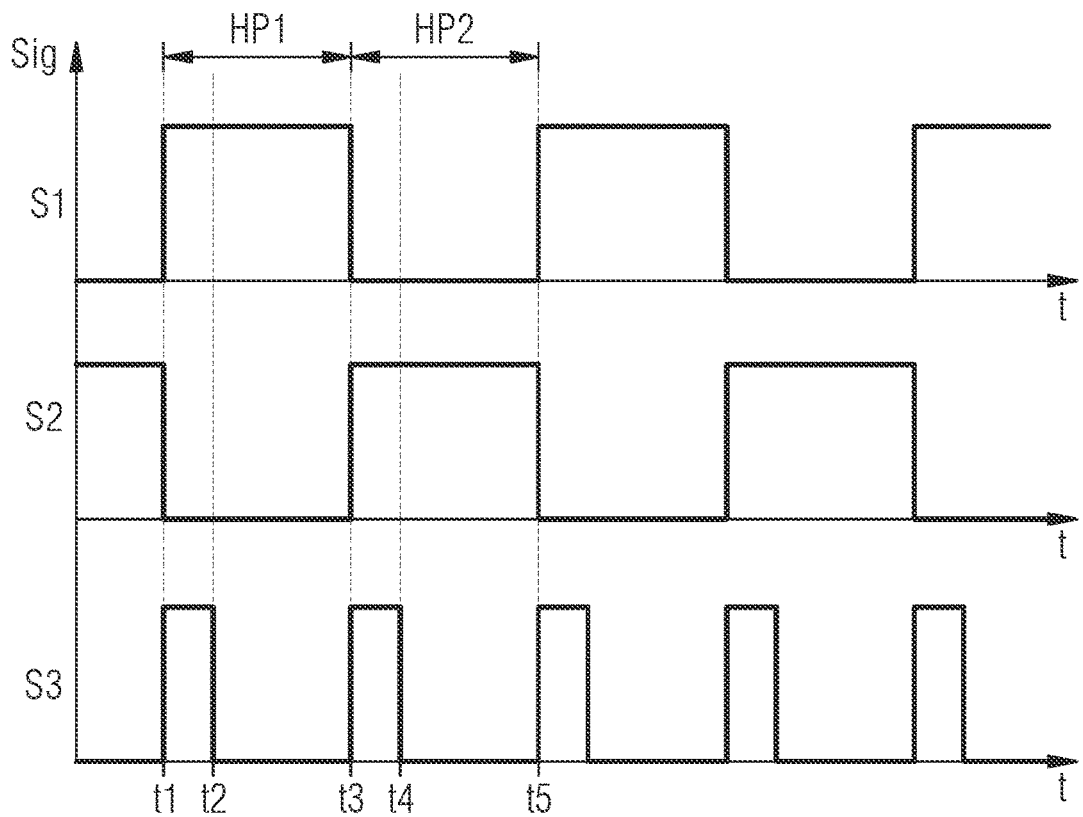
FIG. 2 shows an exemplary graphical plot of a progression over time of the control signals of the switching elements of the inventive resonant converter circuit arrangement.

FIG. 2 shows an exemplary graphical plot of a progression over time of the control signals of the primary-side switching elements S1, S2 of the resonant converter and bidirectional switching element S3 that is arranged in the current path i of the resonant current flowing through the resonant inductor L and the resonant capacitors C1, C2, in the event that a decrease in the output voltage Ua of the resonant converter is necessary.

In this case, the time t is plotted on a horizontal axis and the respective control signal voltage Sig on a vertical axis. A first progression over time in this case shows the control signal of the first switching element S1 of the half-bridge circuit and a second progression over time shows the control signal of the second switching element S2 of the half-bridge circuit, where the dead times during switching of the switching elements S1, S2 have not been indicated for the sake of simplicity. In a third progression, the control signal of the bidirectional switching element S3 is shown. The control signals in this case, for example, take the form of square-wave signals.

From the first and second progression of the control signals of the first and second switching element S1, S2, it is apparent that the switching elements S1, S2 are switched alternately. In this case, for example, the first switching element S1 of the half-bridge circuit is activated in a first half-period HP1 of the control signal and is deactivated in a second half-period HP2 of the control signal. The second switching element S2 of the half-bridge circuit is then deactivated in the first half-period HP1 of the control signal and activated in the second half-period HP2. The control signals for switching the switching elements S1, S2 are based on the switching frequency specified in each case for the switching elements S1, S2, which corresponds to the resonant frequency of the resonant converter.

If a decrease in the output voltage Ua of the resonant converter is necessary or if the integrated functionality BU of the voltage reduction unit is to be activated, then the bidirectional switching element S3 is activated as simultaneously as possible at a first point in time t1 with the start of the first half-period HP1 of the control signal of the first switching element S1 or with the activation of the first switching element S1 of the half-bridge circuit of the resonant converter. A bridging unit (for example, semiconductor switch, relay, and/or MEMS) attached if appropriate in parallel with the bidirectional switching element S3 is in this case opened to terminate the bridging of the bidirectional switching element S3. Until the bridging unit is safely open, the resonant converter can work at least in the short term at a significantly higher switching frequency (as the resonant frequency). A significantly higher power loss as a result of this can be tolerated here, because what is involved is a relatively short period in the region of a few milliseconds up to a few tens of milliseconds, for example.

At a second point in time t2 the bidirectional switching element S3 is then deactivated. The second point in time t2 is specified by a value of the output voltage Ua of the resonant converter to be decreased. In other words, the bidirectional switching element S3 is voltage-controlled as a function of the output voltage Ua or is pulse-width-modulated. The first switching element S1 of the half-bridge circuit continues to be activated until a third point in time t3 (an end of the first half-period HP1). At the third point in time t3, the first switching element S1 of the half-bridge circuit is then also deactivated.

During the first half-period HP1 the resonant converter circuit arrangement thus operates purely as a resonant converter between the first and the second point in time t1, t2. In a phase from the second point in time t2 to the third point in time t3 the energy stored in the resonant inductor L flows (by virtue of the deactivation of the bidirectional switching element S3) via the first diode DB1 of the diode pair DB1, DB2, which acts as a free-wheeling diode, and via the primary winding Wp of the transformer, where a current is induced in the first secondary winding Ws1 of the transformer on the secondary side RWs. The second switching element S2 of the half-bridge circuit is deactivated during the entire first half-period HP1.

At the third point in time t3, the second half-period HP2 of the control signals of both the switching elements S1, S2 of the half-bridge circuit starts. Here, the second switching element S2 of the half-bridge circuit is activated, with a delay of a dead time that is not shown. Synchronized with or approximately simultaneously with the second switching element S2, the bidirectional switching element S3 is also again activated at the third point in time t3. At a fourth point in time t4, the bidirectional switching element S3 is then deactivated again. The second switching element S2 of the half-bridge circuit continues to be activated until a fifth point in time t5 (an end of the second half-period HP2). At the fifth point in time t5 the second switching element S2 of the half-bridge circuit is then also deactivated.

During the second half-period HP2, the resonant converter circuit arrangement again operates purely as a resonant converter between the third and the fourth point in time t3, t4. By virtue of the deactivation of the bidirectional switching element S3 at the fourth point in time t4, the energy stored in the resonant inductor L then flows via the second diode DB2 of the diode pair DB1, DB2, which now function as a free-wheeling diode, and once again via the primary winding Wp of the transformer, where a current is induced in the second secondary winding Ws2 of the transformer on the secondary side RWs. The first switching element S1 of the half-bridge circuit remains deactivated in the entire second half-period HP2 and is not activated again, together with the bidirectional switching element S3, until the fifth point in time t5, which represents the start of the next, first half-period HP1, with a delay of a dead time (not shown).

Figure 3A:
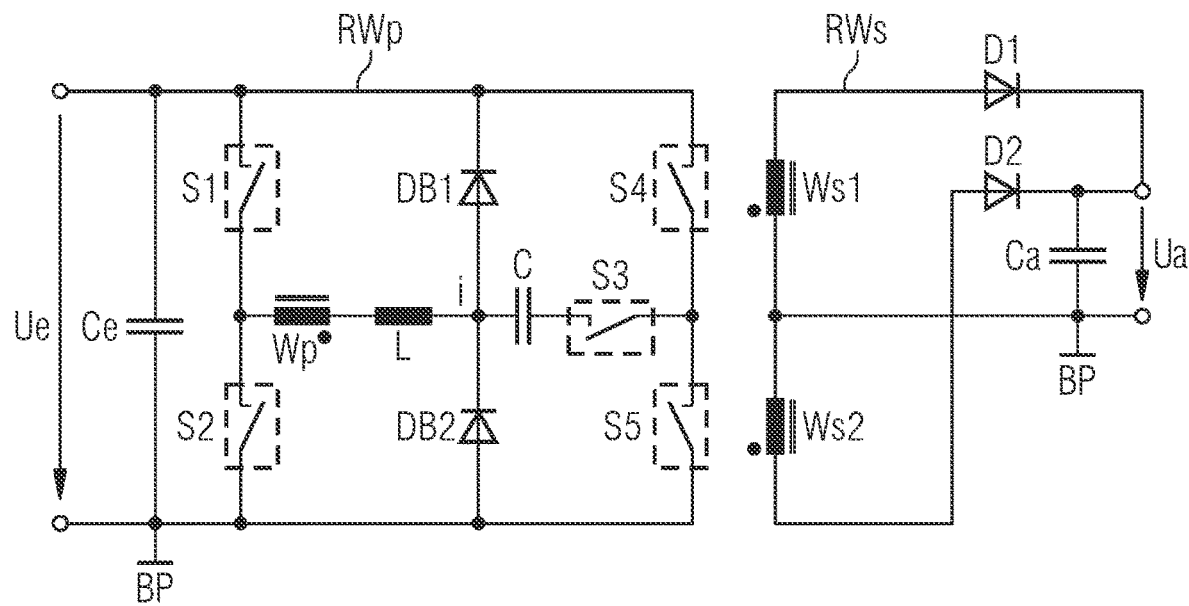
FIGS. 3a and 3b show by way of example and schematically further forms of embodiment of the inventive circuit arrangement of a resonant converter.

FIG. 3a shows a further embodiment of the inventive resonant converter circuit arrangement. Here, an input voltage Ue is again applied to the circuit arrangement on the input side, and can be related to the reference potential BP. An input capacitor Ce is likewise provided on the input side. The circuit further comprises a galvanic isolation or a transformer with a primary winding Wp on the primary side RWp and secondary windings Ws1, Ws2 on the secondary side RWs. Furthermore, on the secondary side RWs the circuit has a rectifier unit with two diodes D1, D2 and an output capacitor Ca, at which the output voltage Ua drops. The output voltage Ua can likewise be related to the reference potential BP or, for example, can float with respect to the primary side RWp.

Two switching elements S1, S2, which are switched in series, are again arranged on the primary side RWp in parallel with the input capacitor Ce. Furthermore, two further switching elements S4, S5 are provided on the primary side, which are likewise arranged in series and with the two input-side switching elements S1, S2 form a full-bridge circuit for actuating the resonant converter circuit arrangement. To this end, two of the four switching elements S1, S2, S4, S5 are each activated or deactivated simultaneously. Switching elements S1, S5 or S2, S4 arranged diagonally opposite in the full-bridge circuit can, for example, be activated or deactivated simultaneously.

A terminal of the primary winding Wp is again connected to the center of the series circuit of both the input-side switching elements S1, S2 or a first half-bridge made up of the switching elements S1, S2 of the full-bridge circuit. The other terminal of the primary winding Wp is connected to the resonant circuit, which is formed by a resonant inductor L and a resonant capacitor C. Here, the first terminal of the resonant inductor L is connected to the primary winding Wp and the second terminal of the resonant inductor L is connected to a first terminal of the resonant capacitor C. The bidirectional switching element S3 is arranged between a second terminal of the resonant capacitor C and a center of the series circuit of both the further switching elements S4, S5 in the current path i of the resonant current through the resonant inductor L and through the resonant capacitor C. In other words, the bidirectional switching element S3 is connected by the first terminal to the second terminal of the resonant capacitor C and by the second terminal to the center of the series circuit made up of both the further primary-side switching elements S4, S5, which forms a second half-bridge for the full-bridge circuit.

Furthermore, a diode pair DB1, DB2 is likewise provided. Both the diodes DB1, DB2 of the diode pair DB1, DB2 are arranged in series and function as free-wheeling diodes DB1, DB2 for the integrated functionality of the voltage reduction unit. Here, a center of the series circuit of the diode pair DB1, DB2 is connected to the second terminal of the resonant inductor L and to the first terminal of the resonant capacitor C. The respective ends of the series circuit of the diode pair DB1, DB2 are each connected to the corresponding ends of both the half-bridges of the full-bridge circuit, which is formed from the two input-side switching elements S1, S2 or the two further switching elements S4, S5.

In normal mode, i.e., in operation at rated voltage, the bidirectional switching element S3 is either again permanently activated or bridged or short-circuited by a bridging unit (semiconductor switch, relay, and/or MEMS) arranged in parallel with the bidirectional switching element S3. The circuit then operates as a resonant converter in resonant mode. If a decrease in the output voltage Ua of the resonant converter is necessary, then the bidirectional switching element S3 is actuated (pulse-width-modulated or as a function of the output voltage Ua). Here, the bidirectional switching element S3 is again activated synchronously with the switching elements S1, S5 or S2, S4 to be activated in each case and is deactivated before the respectively activated switching elements S1, S5 or S2, S4, in order to integrate the functionality BU of a voltage reduction unit into the resonant converter.

Figure 3B:
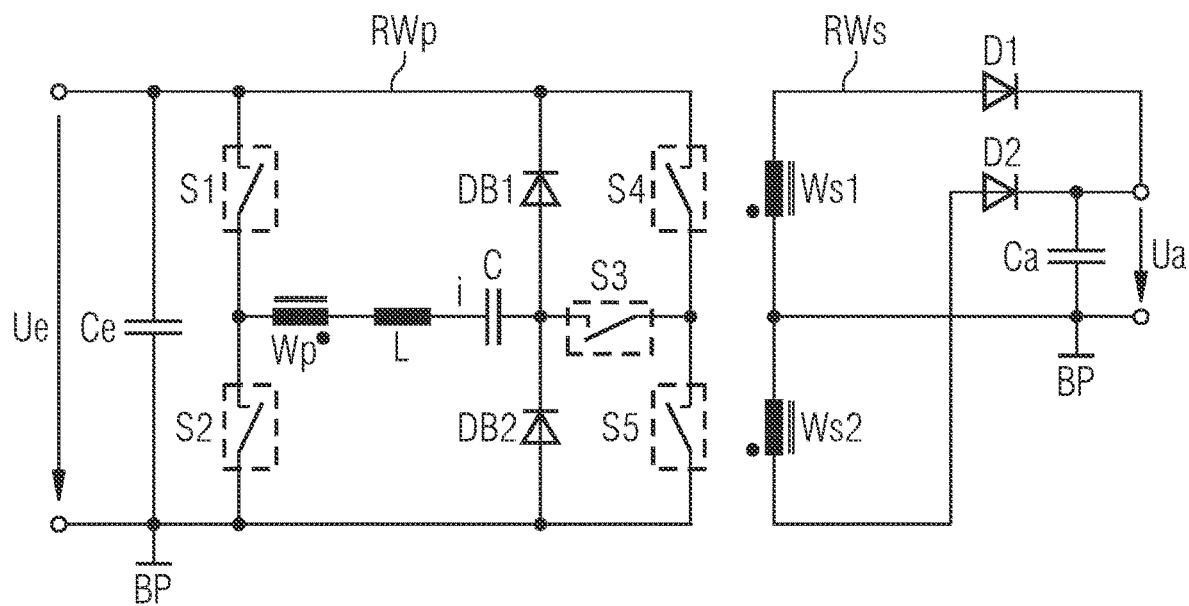

FIG. 3b shows a further embodiment of the inventive resonant converter circuit arrangement with a full-bridge circuit for actuation, where the full-bridge circuit is again formed by the two switching elements S1, S2 arranged on the input side and two further primary-side switching elements S4, S5. The present exemplary embodiment differs from the circuit arrangement shown in FIG. 3a only by the arrangement of the diode pair DB1, DB2 in the circuit. In exemplary embodiment of the inventive circuit arrangement shown in FIG. 3b, the resonant capacitor C is again connected by the first terminal to the resonant inductor L. However, the center of the series circuit of the diode pair DB1, DB2 is now connected to the second terminal of the resonant capacitor C and to the first terminal of the bidirectional switching element S3. The ends of the series circuit of the diode pair DB1, DB2 are again connected to the respective ends of both the half-bridges of the full-bridge circuit, which are formed from the two input-side switching elements S1, S2 or the two further switching elements S4, S5.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit arrangement for a resonant converter with a galvanic isolation, the circuit arrangement comprising:
at least one resonant inductor, at least one resonant capacitor and at least two switching elements arranged on a primary side of the circuit arrangement, alternately switching the at least two primary-side switching elements at a specified switching frequency causing a resonant current to flow through the at least one resonant inductor and the at least one resonant capacitor;
a bidirectional switching element is arranged in a current path of the resonant current through the at least one resonant inductor and through the at least one resonant capacitor;
a diode pair, a center of a series circuit of the diode pair being connected to a terminal of the at least one resonant inductor or to a terminal of the at least one resonant capacitor and a respective end of the series circuit of the diode pair each being connected to a switching element of the at least two primary-side switching elements, such that a functionality of a voltage reduction unit is integrated, in an event that the bidirectional switching element is activated with a switching element, to be activated in each case, of the at least two primary-side switching elements and before a switching element, to be deactivated in each case, of the at least two primary-side switching elements;

wherein the at least one resonant inductor is utilized as an inductor and the diode pair is utilized as free-wheeling diodes for the functionality of the voltage reduction unit.

2. The circuit arrangement as claimed in claim 1, wherein the bidirectional switching element is controlled as a function of an output voltage of the resonant converter.

3. The circuit arrangement as claimed in claim 1, wherein the bidirectional switching element is permanently activated during a normal mode of the resonant converter.

4. The circuit arrangement as claimed in claim 2, wherein the bidirectional switching element is permanently activated during a normal mode of the resonant converter.

5. The circuit arrangement as claimed in claim 1, further comprising:

a bridging unit which is arranged in parallel with the bidirectional switching element;

wherein the bidirectional switching element is bridged by closing the bridging unit.

6. The circuit arrangement as claimed in claim 1, wherein the at least two primary-side switching elements are arranged on an input side of the circuit arrangement as a half-bridge circuit.

7. The circuit arrangement as claimed in claim 5, wherein a center of the series circuit of the diode pair is connected to a terminal of the at least one resonant inductor, which is connected to a first terminal of the bidirectional switching element;

wherein the at least one resonant capacitor is formed by two capacitors arranged in series; and wherein a center of the series circuit of the two capacitors is connected to a second terminal of the bidirectional switching element and respective ends of the series circuit of the two capacitors are connected to respective ends of the series circuit of the diode pair (DB1, DB2) and in each case to one of the at least two primary-side switching elements.

8. The circuit arrangement as claimed in claim 1, wherein two further switching elements are provided on the primary side, which with the at least two primary-side switching elements form a full-bridge circuit.

9. The circuit arrangement as claimed in claim 2, wherein two further switching elements are provided on the primary side, which with the at least two primary-side switching elements form a full-bridge circuit.

10. The circuit arrangement as claimed in claim 3, wherein two further switching elements are provided on the primary side, which with the at least two primary-side switching elements form a full-bridge circuit.

11. The circuit arrangement as claimed in claim 5, wherein two further switching elements are provided on the primary side, which with the at least two primary-side switching elements form a full-bridge circuit.

12. The circuit arrangement as claimed in claim 8, wherein the center of the series circuit of the diode pair is connected to a terminal of the at least one resonant inductor, which is connected to a first terminal of the at least one resonant capacitor;

wherein a second terminal of the at least one resonant capacitor is connected to a first terminal of the bidirectional switching element;

wherein a center of a series circuit formed by the two further primary-side switching elements is connected to a second terminal of the bidirectional switching element; and wherein the respective ends of the series circuit of the diode pair are connected in each case to a switching element of the at least two primary-side switching elements and in each case to one of the two further primary-side switching elements.

13. The circuit arrangement as claimed in claim 8, wherein the at least one resonant capacitor is connected by a first terminal to the at least one resonant inductor;

wherein a second terminal of the resonant capacitor is connected to a first terminal of the bidirectional switching element and to the center of the series circuit of the diode pair;

wherein a center of a series circuit made up of the two further primary-side switching elements is connected to a second terminal of the bidirectional switching element; and wherein respective ends of the series circuit of the diode pair are each connected to a switching element of the at least two primary-side switching elements and in each case to one of the two further primary-side switching elements.

14. The circuit arrangement as claimed in claim 1, wherein the bidirectional switching element is composed of anti-serially switched transistors.

15. The circuit arrangement as claimed in claim 1, further comprising:

a micro-electro-mechanical system (MEMS) which forms a bidirectional switching element.

* * * * *